(12) United States Patent
Stumbo

(10) Patent No.: US 8,891,145 B2
(45) Date of Patent: Nov. 18, 2014

(54) SYSTEM AND METHOD FOR DIGITIZING DOCUMENTS AND ENCODING INFORMATION RELATING TO SAME FOR DISPLAY BY HANDHELD COMPUTING DEVICES

(75) Inventor: William K. Stumbo, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1343 days.

(21) Appl. No.: 11/803,523

(22) Filed: May 16, 2007

(65) Prior Publication Data

US 2008/0285090 A1 Nov. 20, 2008

(51) Int. Cl.
*H04N 1/46* (2006.01)
*H04N 1/00* (2006.01)
*G06F 3/147* (2006.01)
*H04N 1/32* (2006.01)

(52) U.S. Cl.
CPC ....... *H04N 1/00326* (2013.01); *H04N 1/00331* (2013.01); *H04N 1/00392* (2013.01); *H04N 1/00469* (2013.01); *H04N 2201/0065* (2013.01); *H04N 1/0044* (2013.01); *H04N 1/00472* (2013.01); *H04N 2201/3274* (2013.01); *G09G 2340/145* (2013.01); *G06F 3/147* (2013.01); *H04N 1/32101* (2013.01); *G09G 2340/0407* (2013.01); *H04N 2201/3278* (2013.01); *H04N 2201/3266* (2013.01)
USPC ........... 358/538; 358/505; 358/530; 358/539; 358/474; 358/426.02; 382/101; 382/176; 382/282

(58) Field of Classification Search
USPC .............. 358/1.15, 1.13, 1.16, 538, 453, 462, 358/471, 472, 473, 474, 1.9, 2.1, 501, 505, 358/539, 401, 448, 426.02, 426.04; 382/240, 128, 101, 103, 115, 123, 176, 382/180, 235, 238, 282, 292; 345/179; 399/17, 82, 84, 108, 363, 365
See application file for complete search history.

(56) References Cited

U.S. PATENT DOCUMENTS

| | | | | |
|---|---|---|---|---|
| 7,167,604 B2 * | 1/2007 | Allen et al. | .................. | 382/313 |
| 7,483,582 B2 * | 1/2009 | Ozawa et al. | ................ | 382/240 |
| 7,542,160 B2 * | 6/2009 | Parry et al. | .................... | 358/1.15 |
| 8,073,211 B2 * | 12/2011 | Halmann | ...................... | 382/128 |
| 2002/0131636 A1 * | 9/2002 | Hou | .............................. | 382/181 |
| 2004/0223197 A1 * | 11/2004 | Ohta et al. | .................... | 358/538 |
| 2005/0177783 A1 * | 8/2005 | Agrawala et al. | ............ | 715/512 |
| 2005/0185000 A1 * | 8/2005 | Nonaka | .......................... | 345/590 |
| 2006/0088214 A1 | 4/2006 | Handley et al. | | |
| 2007/0279711 A1 * | 12/2007 | King et al. | .................... | 358/508 |

* cited by examiner

Primary Examiner — Vu B Hang
(74) Attorney, Agent, or Firm — MH2 Technology Law Group LLP

(57) ABSTRACT

A system and method are provided for processing scanned documents by digitizing the scanned documents, converting the digitized documents to a JPEG2000 file, encoding content information corresponding to the digitized documents using spatial capabilities of JPEG2000's Region of Interest feature, and creating an image file having the digitized documents and the region of interest information for forwarding to a computing device, such as a handheld computing device, for display. The system and method are especially useful in Digital Mail applications which entail digitizing and delivering mail documents to recipients.

26 Claims, 6 Drawing Sheets

SYSTEM AND METHOD FOR DIGITIZING DOCUMENTS AND ENCODING INFORMATION RELATING TO SAME FOR DISPLAY BY HANDHELD COMPUTING DEVICES

BACKGROUND

The present disclosure relates to the field of document digitization, and more particularly, to a system and method for digitizing documents and encoding information relating to the digitized documents in order for the digitized documents and the encoded information to be displayed by handheld computing devices. The information relating to the digitized documents can be encoded using JPEG2000.

JPEG2000 provides several advantageous features that make it useful in interacting with low bandwidth devices. One such feature is its ability to encode images and provide a low quality version of the scanned image which can be quickly loaded into a window for viewing. Additionally, the JPEG2000 Interactive Protocol (JPIP) defined as Part 9 of the JPEG2000 set of standards provides a methodology for selective access to needed image data for a JPEG2000 viewer. This methodology reduces the amount of information that needs to be processed to display an image. Another advantageous feature of JPEG2000 is its Region of Interest feature. This feature is often used by cartographers and others interacting with maps, since the feature allows specific locations (or regions of interest) within an image to be identified and tagged. JPEG2000 provides the ability to encode the region of interest information within the image file. It is noted that JPEG2000 also specifies another form of Region of Interest in which detailed image data is encoded in the codestream allowing early rendering of detailed portions of parts of an image.

The conventional, prior art process for digitizing mail and delivering it to the addressee will now be described with reference to FIG. 1. In Steps 100 and 102, incoming mail is received in a mailroom and sorted. Generally mail is sorted based on delivery priority and/or mail stops. For instance, mail delivered to certain executives may be sorted out first and delivered prior to completion of the rest of the sort process and other mail delivery. Mail to be delivered digitally is opened and prepared or prepped for scanning in step 104. This includes opening the mail, unfolding, removing staples, separating out material that can not be scanned (books and other items) and/or other actions necessary prior to scanning the mail. Mail which is not going to be delivered digitally proceeds through a standard incoming mail processing path.

In Steps 106 and 108, the mail documents are scanned and converted to a PDF file or other format suitable for distribution. The scanner may be a standalone scanning device, a multifunction device (MFD) or some other document scanner. The only requirement is that it be able to produce a binary, gray or color image representation of the paper-based document. The paper, mail documents are then sent for archival or destruction.

In Step 110, the recipient(s) is identified and the digitized document is attached to an electronic mail note and the recipient's e-mail address is found in the corporate address book (or a local address book). Another approach is to store the scanned document into a repository in Step 110A and e-mail the recipient(s) a URL link or other electronic link to the document. This has the advantage that fewer large e-mails are sent through the e-mail system. In addition, it ensures that an original electronic version of the document exists in a repository for audit and regulatory purposes.

In Step 112, the document is sent to the recipient(s). In Step 114, the recipient receives the e-mail with the scanned document as an attachment (or a URL link that needs to be followed to gain access to the document). When the document is accessed, in Step 116 a reader, such as Adobe® Reader or other reader capable of reading PDF files, such as CorelDraw®, loads the file, interprets the PDF stream and generates the first page for viewing by the recipient(s). Viewing may require opening a connection to the repository, authentication and downloading of the digitized documents.

For memory constrained devices, such as handheld computing devices, there are several major drawback, they may not be able to store and display the complete PDF file or they may take a long time to download the file, since they are generally connected to the corporate infrastructure via low bandwidth wireless networks. Additionally, for handheld computing devices having small displays, once the document is displayed, the user needs to zoom in and pan around the document to find and read the desired information. These drawbacks have historically made it difficult and cumbersome to use handheld computing devices for reading Digital Mail and other digitized documents.

FIG. 2 shows what a digitized document D1 looks like displayed using Adobe® Reader on a handheld computing device designated by reference numeral 200. To help with readability of textual documents on handheld computing devices, Adobe® Reader provides the ability to reflow text. This enables a portion of the digitized document D1 to be displayed by a display 202 of the handheld computing device 200 in a format more suitable to the screen size of the handheld computing device 200. However, this technique does not work with scanned documents, such as digitized mail.

SUMMARY

It is therefore an aspect of the present disclosure to provide a system and method for processing scanned documents by digitizing the scanned documents, converting the digitized documents to a JPEG2000 file, encoding content information corresponding to the digitized documents' using spatial capabilities of JPEG2000's Region of Interest feature, and creating an image file having the digitized documents and the region of interest information for forwarding to a computing device, such as a handheld computing device, for display. The system and method are especially useful in Digital Mail applications which entail digitizing and delivering mail documents to recipients.

In particular, according to the present disclosure, a system is provided having a scanner for scanning and digitizing documents, and a processor in operative communication with the scanner. The processor stores programmable instructions configured for being executed by the processor for receiving the digitized documents, converting the digitized documents to a predetermined format, such as JPEG2000, encoding content information corresponding to the digitized documents using spatial capabilities of the predetermined format, and creating an image file having the digitized documents and the region of interest information for forwarding to a computing device, such as a handheld computing device, for display. It is contemplated that the processor can be located within the scanner or outside the scanner, such as within a personal computer. It is further contemplated that the scanner can be a computing device capable of only scanning documents, or a multi-function computing device capable of scanning, faxing, copying, and printing documents.

The present disclosure further provides a method for processing digitized documents by converting the digitized documents to a predetermined format, such as JPEG2000, encoding content information corresponding to the digitized documents using spatial capabilities of the predetermined format, and creating an image file having the digitized documents and the region of interest information for forwarding to a computing device, such as a handheld computing device, for display to enable viewing by a recipient.

The present disclosure also provides a handheld computing device having a display and a processor for receiving an image file and displaying contents associated with the image file on the display. The image file having been created by an external processor receiving digitized documents, converting the digitized documents to a predetermined format, such as JPEG2000, encoding content information corresponding to the digitized documents using spatial capabilities of the predetermined format, and creating the image file having the digitized documents and region of interest information.

The present disclosure further provides a computer-readable medium storing programmable instructions configured for execution by a processor for receiving digitized documents, converting the digitized documents to a predetermined format, such as JPEG2000, encoding content information corresponding to the digitized documents using spatial capabilities of the predetermined format, and creating an image file having the digitized documents and the region of interest information for forwarding to a computing device, such as a handheld computing device, for display. The computer-readable medium can be a CD-ROM, flash memory, memory card, or other device capable of storing data, such as the programmable instructions.

BRIEF DESCRIPTION OF THE DRAWINGS

Various embodiments of the present disclosure will be described herein below with reference to the figures wherein.

DETAILED DESCRIPTION

The present disclosure provides a system having a scanner for digitizing documents, and a processor in operative communication with the scanner. The processor stores programmable instructions configured for being executed by the processor for receiving the digitized documents, converting the digitized documents to a predetermined format, such as JPEG2000, encoding content information corresponding to the digitized documents using spatial capabilities of the predetermined format (Region of Interest feature of JPEG2000), and creating an image file having the digitized documents and the region of interest information for forwarding to a computing device, such as a handheld computing device, for display.

It is contemplated that the processor can be located within the scanner or outside the scanner, such as within a personal computer, a server, a network router, etc. It is further contemplated that the scanner can be a computing device capable of only scanning documents, or a multi-function computing device capable of scanning, faxing, copying, and printing documents.

The present disclosure further provides a method for processing digitized documents by converting the digitized documents to a predetermined format, such as JPEG2000, encoding content information corresponding to the digitized documents using spatial capabilities of the predetermined format, and creating an image file having the digitized documents and the region of interest information for forwarding to a computing device, such as a handheld computing device, for display to enable viewing by a recipient.

The present disclosure further provides a computer-readable medium storing programmable instructions configured for execution by a processor for receiving digitized documents, converting the digitized documents to a predetermined format, such as JPEG2000, encoding content information corresponding to the digitized documents using spatial capabilities of the predetermined format, and creating an image file having the digitized documents and the region of interest information for forwarding to a computing device, such as a handheld computing device, for display. The computer-readable medium can be a CD-ROM, flash memory, memory card, or other device capable of storing data, such as the programmable instructions.

Figure 1:
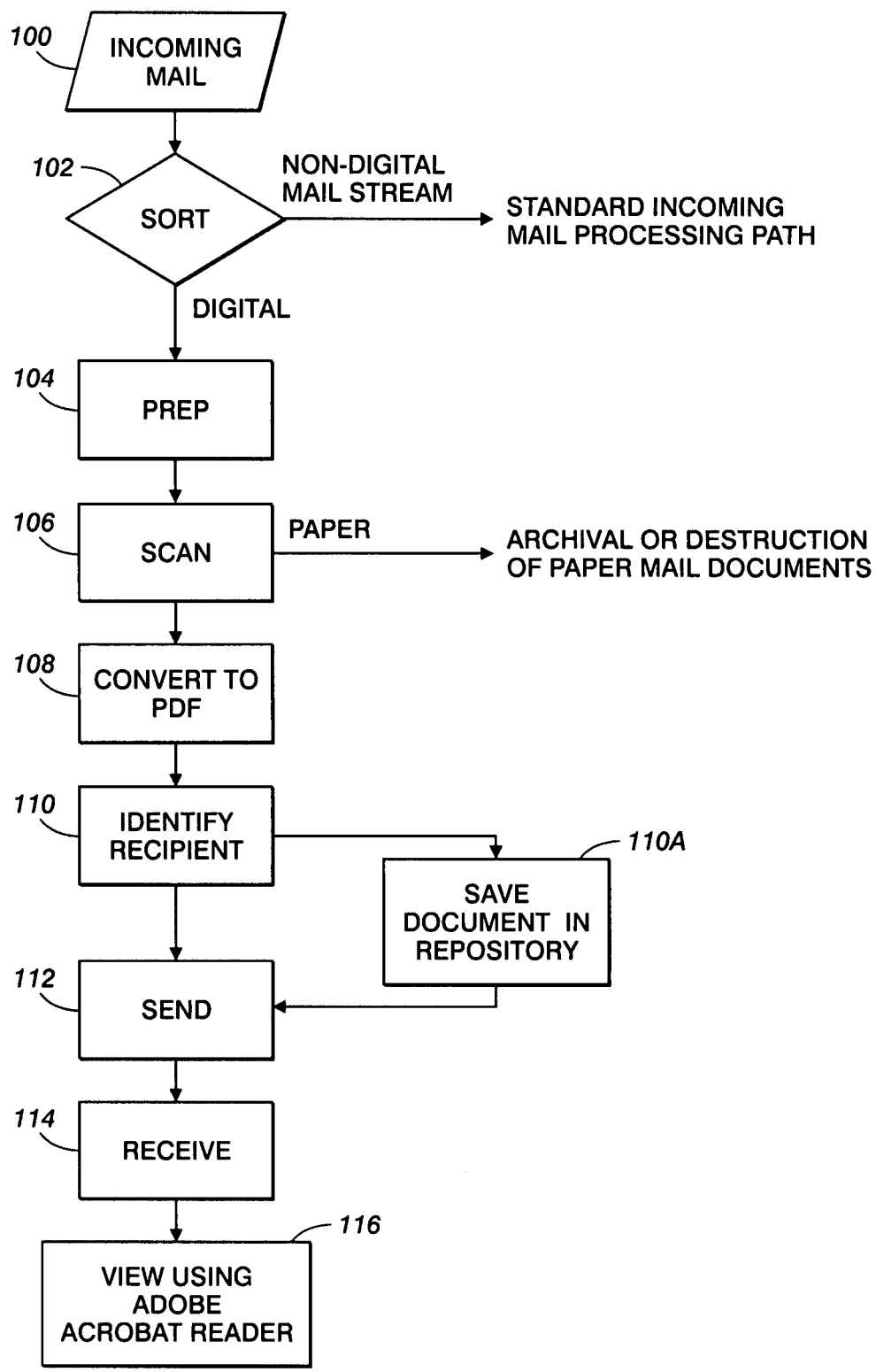
FIG. 1 illustrates a flow chart depicting a prior art method for digitizing and delivering mail to a recipient.
Figure 2:
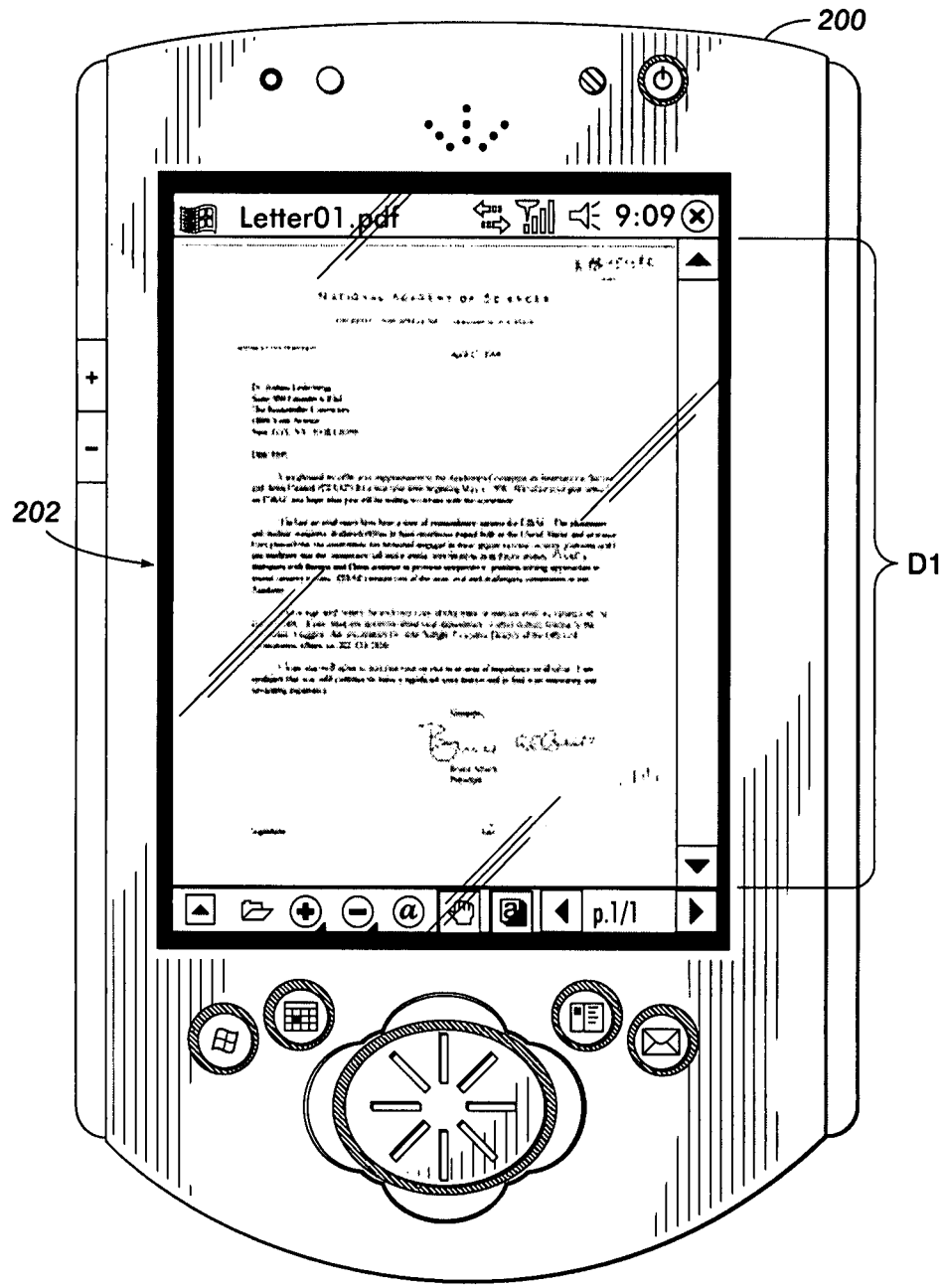
FIG. 2 is a front view of a handheld computing device displaying a digitized document delivered and displayed to a recipient in accordance with the prior art method depicted by FIG. 1.
Figure 3:
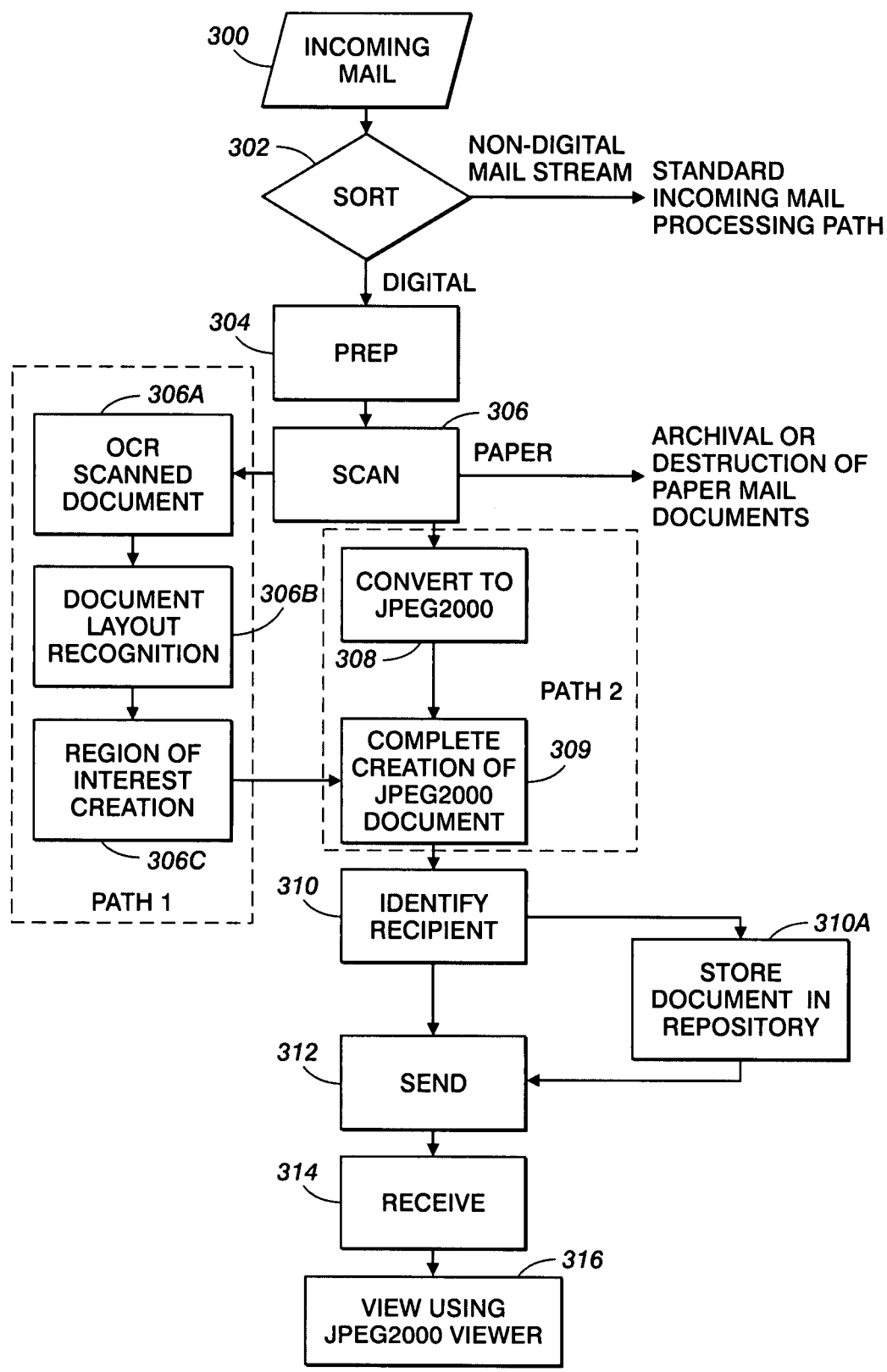
FIG. 3 illustrates a flow chart depicting a method for digitizing and delivering mail to a recipient in accordance with the present disclosure.
Figure 4:
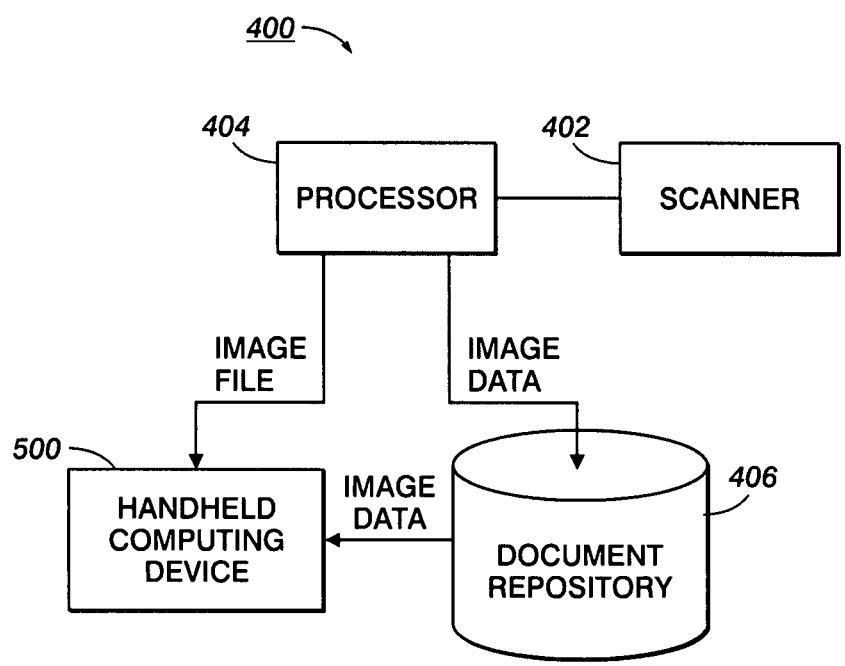
FIG. 4 illustrates a block diagram of a system for digitizing and delivering mail to a recipient in accordance with the method depicted by FIG. 3.

In particular, with reference to FIGS. 3 and 4, there is shown respectively a flow chart depicting a method and system for digitizing documents, converting the digitized documents to a predetermined format, such as JPEG2000, encoding content information corresponding to the digitized documents using spatial capabilities of the predetermined format, and delivering the digitized documents and encoded information to a computing device, such as a handheld computing device, for display in accordance with the present disclosure.

In Steps 300 and 302, incoming mail is received in a mailroom and sorted. Generally mail is sorted based on delivery priority and/or mail stops. For instance, mail delivered to certain executives may be sorted out first and delivered prior to completion of the rest of the sort process and other mail delivery. Mail to be delivered digitally is opened and prepared or prepped for scanning in step 304. This includes opening the mail, unfolding, removing staples, separating out material that can not be scanned (books and other items) and/or other actions necessary prior to scanning the mail. Mail which is not going to be delivered digitally proceeds through a standard incoming mail processing path.

In Steps 306 and 308, the mail documents are scanned and converted to a JPEG2000 file or other format suitable for distribution. The scanner may be a standalone scanning device, a multifunction device (MFD) or some other document scanner. The only requirement is that it be able to produce a binary, gray or color image representation of the paper-based document. The paper, mail documents are then sent for archival, destruction or other processing steps beyond the scope of this disclosure.

Following path 1, in Step 306A, optical character recognition is performed on the image files corresponding to the scanned documents. The output of the OCR process is used at Step 306B by a Document Layout Recognizer (DLR). The DLR is described in U.S. patent application Ser. No. 10/970,930 filed on Oct. 22, 2004, titled "System and Method For Identifying and Labeling Fields of Text Associated With Scanned Business Documents"; the entire contents of this reference are incorporated herein by reference.

The result of Steps 306A and 306B is a textual representation of the documents with various structural components tagged (i.e., tagged fields of interest). For instance, the address blocks are tagged as either the addressee or sender's address block depending on their location within the document, elements such as the date line and subject are also identified. Tagging allows structural components of interest to be identified for inclusion into the digitized document.

The final step in path 1 is Step 306C which encodes at least one spatial position within the digitized document(s) of at least one tagged field of interest (addressee, subject, sender, paragraph summaries, etc.). The content information of the digitized document is encoded as metadata using JPEG2000's predefined region of interest metadata tags. In particular, this step encodes content information corresponding to the digitized documents using spatial capabilities of JPEG2000, i.e., JPEG2000's Region of Interest feature.

Path 2 takes the image file created by scanning and converts it to a JPEG2000 file (Step 308). JPEG2000 provides tools for controlling the compression process and optimizing the output file for specific operations. The JPEG2000 file is created to deliver a low quality version of the scanned image; an image that is suited for display on a small user interface. The compressed JPEG2000 image is structured to be able to deliver an image sized for a handheld computing device (e.g., 240×240 pixels, 240×320 pixels, and 320×320 pixels).

Paths 1 and 2 merge at Step 309. In this step, the region of interest information created at Step 306C is added to the JPEG2000 file created at Step 308. The process then proceeds with Step 310.

In Step 310, the recipient(s) is identified and the digitized document is attached to an electronic mail note and the recipient's e-mail address is found in the corporate address book (or a local address book). Another approach is to store the scanned document into a repository in Step 310A and e-mail the recipient(s) a URL link or other electronic link to the document. This has the advantage that fewer large e-mails are sent through the e-mail system. In addition, it ensures that an original electronic version of the document exists in a repository for audit and regulatory purposes. An added advantage of the digital mail processing in accordance with the present disclosure is that business mail generally contains an address block identifying the recipient of the document. Having identified the textual block containing the addressee information, the process according to the present disclosure can automatically mail the document to the correct individual. This reduces the need for human interaction in processing the digital mail document, speeding delivery to the end customer.

In Step 312, the document is sent to the recipient(s). In Step 314, the recipient receives the e-mail with the scanned document as an attachment (or a URL link that needs to be followed to gain access to the document).

When the document is accessed, in Step 316 a reader, such as a JPEG2000 viewer, is used to view the document corresponding to the created file. The viewer needs only to support standard JPEG2000. The visual presentation is enhanced by identifying the document components that contain region of interest backing data. The user can then tap on these regions of interest with the handheld stylus (or other user interface pointing device) to bring up the textual region of interest information for viewing.

FIG. 4 illustrates a block diagram of a system for digitizing and delivering mail to a recipient in accordance with the method depicted by FIG. 3. The system designated generally by reference numeral 400 includes a scanner 402 for scanning and digitizing documents, and a processor 404 in operative communication with the scanner 402. The processor 404 stores programmable instructions configured for being executed by the processor 404 for performing the method described above with reference to FIG. 3. The method includes receiving the digitized documents, converting the digitized documents to a predetermined format, such as JPEG2000, encoding content information corresponding to the digitized documents using spatial capabilities of the predetermined format, and creating an image file having the digitized documents and the region of interest information for forwarding to a computing device, such as a handheld computing device, for display.

It is contemplated that the processor 404 can be located within the scanner 402 or outside the scanner 402, such as within a personal computer, a server, a network router, etc. It is further contemplated that the scanner 402 can be a computing device capable of only scanning documents, or a multi-function computing device capable of scanning, faxing, copying, and printing documents.

Figure 5:
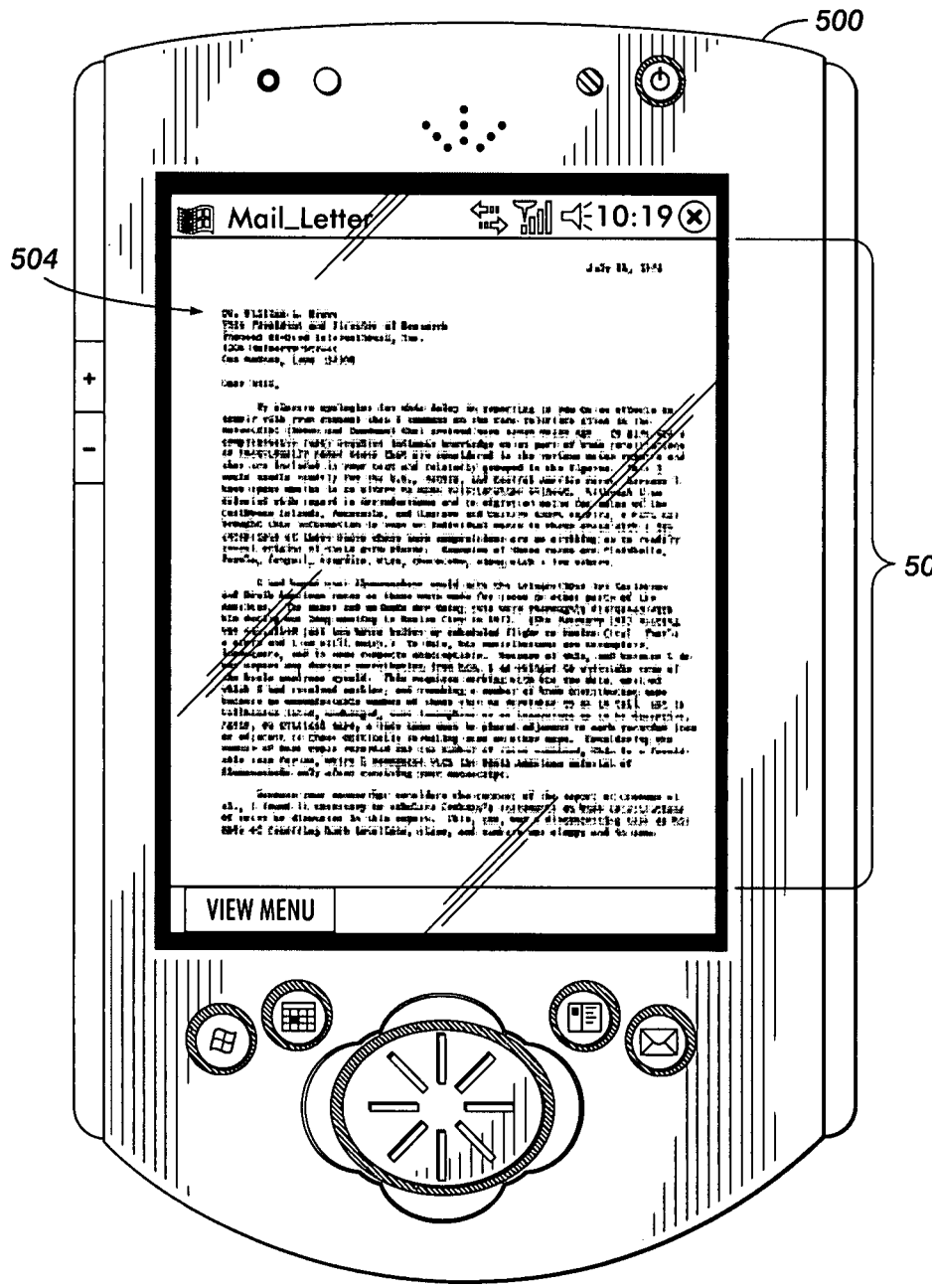
FIGS. 5 and 6 are front views of a handheld computing device displaying a digitized document delivered and displayed to a recipient in accordance with the present disclosure.
Figure 6:
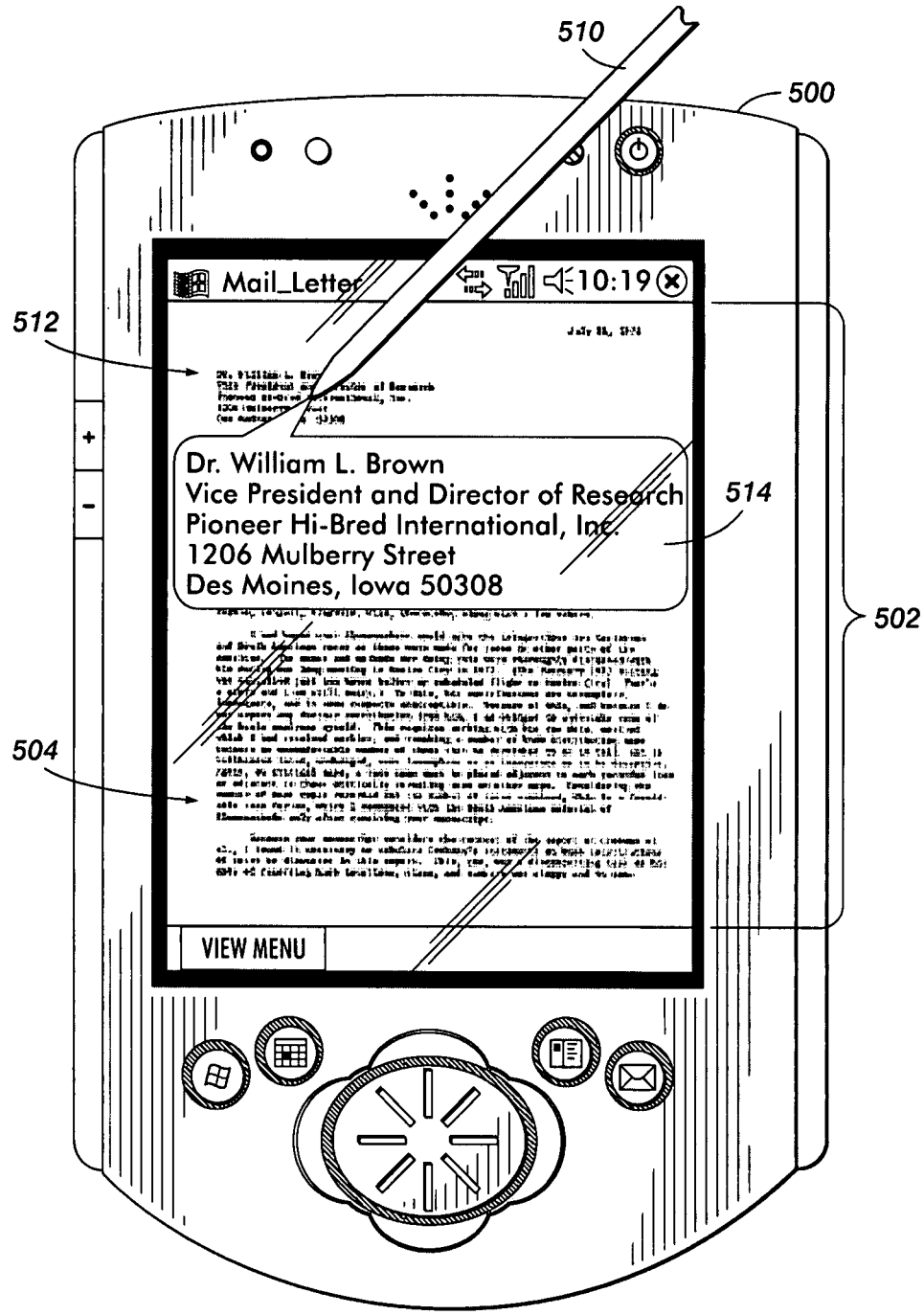

FIGS. 5 and 6 are front views of a handheld computing device 500 in accordance with the present disclosure. The handheld computing device 500 is a personal digital assistant (PDA); however, other types of handheld computing devices can be used to embody and implement the system and method of the present disclosure.

The device 500 displays an image 502 of a document on a display 504. The image 502 is created and delivered to the device 500 using the above-described system and process in accordance with the present disclosure. FIG. 6 illustrates a stylus 510 tapping on a region of interest 512 corresponding to the image 502 to bring up the textual region of interest information 514 for viewing. The device 500 is programmed for displaying the digitized document on the display 504 and to bring up the textual region of interest information 514 for viewing upon the stylus 510 tapping on the region of interest 512.

The main advantages of the process described herein in accordance with the present disclosure is that it allows minimal image data to be presented to the user, providing enough image data so that the user can understand the context and structure of the mail item, and also enabling the user to access region of interest text data where additional content is desired. Therefore, the process in accordance with the present disclosure potentially removes one of the most significant barriers to using handheld computing devices to process and read digitized mail.

The above-described processing steps in accordance with the present disclosure create image files whose usability is limited. For example, if a digitized document corresponding to an image file is later viewed on a desktop personal computer or laptop, image quality may suffer because the needed details for larger viewing are not present in the created JPEG2000 image file.

For this reason, the present disclosure also provides for the processor 404 to transfer image data corresponding to the JPEG2000 image file to a document repository (see FIG. 4), such as a database. The handheld computing device 500 is programmed to be able to retrieve the image data corresponding to the digitized document transferred from the document repository 406 using the JPIP protocol. This approach allows the JPEG2000 image file to be created as large as necessary for serving a number of different viewing platforms, such as handheld computing devices, desktop personal computers, television displays, and laptops, and without compromising image quality.

If image data is not retrieved from the document repository 406 by the handheld computing device 500 using the JPIP protocol. The large JPEG2000 image file would not be effectively handled and displayed by the handheld computing device 500.

When retrieving image data from the document repository 406, the handheld computing device 500 is programmed to request just enough image data to present a low resolution/low quality image representation of the scanned document on the display 504. The image will then be displayed, allowing the user to understand the intent and purpose of the document, or at least as much as can be determined by examining the layout and the user's knowledge of previous correspondence. Where additional data is needed, the user merely taps the location of the image with the handheld stylus 510 and the textual data for the particular region of interest is retrieved from the document repository 406 and displayed by the display 504. As such, requested image data is retrieved individually and the handheld computing device 500 is able to effectively process and display the desired image data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
    a scanner for scanning one or more original mail documents;
    a processing system comprising one or more computer-readable media, wherein the computer-readable media contain instructions that, when executed by the processing system, cause the processing system to perform operations comprising:
        creating one or more digitized documents based on the one or more original mail documents;
        extracting textual information from the one or more digitized documents, wherein:
            the textual information comprises intended recipient information of the one or more original mail documents; and
            the intended recipient information is not an electronic mail address;
        identifying and tagging the intended recipient information in the textual information based on a location of the intended recipient information within the one or more digitized documents;
        identifying and tagging a region of interest in the textual information, wherein the region of interest is associated with a location within the one or more digitized documents;
        creating an image file, wherein the image file comprises a graphical representation of the one or more digitized documents and the textual information;
        encoding the region of interest and the location associated with the region of interest in the image file, such that when a user selects the location on a user device an enlarged version of the region of interest is displayed on the user device;
        searching an electronically stored address record for an electronic mail address using the intended recipient information of the one or more original mail documents;
        retrieving, from the electronically stored address record, the electronic mail address; and
        sending an electronic mail message to the electronic mail address, wherein the electronic mail message comprises one or more of the image file and a reference to the image file.

2. The system according to claim 1, wherein creating the image file comprises:
    converting the one or more digitized documents to a JPEG2000 format; and
    encoding the textual information and the region of interest as metadata using one or more predefined region of interest metadata tags of the JPEG2000 format.

3. The system according to claim 1, further comprising a handheld computing device, wherein the image file and the textual information are configured for being displayed by a display of the handheld computing device.

4. The system according to claim 1, wherein the textual information comprises one or more of addressee information, sender information, date information, subject information, and letter body information.

5. The system according to claim 1, further comprising a document repository for storing image data corresponding to the image file.

6. The system according to claim 5, further comprising a handheld computing device having a display and configured for receiving image data transferred from the document repository for displaying the image data on the display.

7. A method for processing digitized documents comprising:
    creating one or more digitized documents based on one or more original mail documents;
    extracting textual information from the one or more digitized documents, wherein:
        the textual information comprises intended recipient information of the one or more original mail documents; and
        the intended recipient information is not an electronic mail address;
    identifying and tagging the intended recipient information in the textual information based on a location of the intended recipient information within the one or more digitized documents;
    identifying and tagging a region of interest in the textual information, wherein the region of interest is associated with a location within the one or more digitized documents;
    creating, using a processor, an image file, wherein the image file comprises a graphical representation of the one or more digitized documents and the textual information;
    encoding the region of interest and the location associated with the region of interest in the image file, such that when a user selects the location on a user device an enlarged version of the region of interest is displayed on the user device;
    searching an electronically stored address record for an electronic mail address using the intended recipient information of the one or more original mail documents;
    retrieving, from the electronically stored address record, the electronic mail address; and
    sending an electronic mail message to the electronic mail address, wherein the electronic mail message comprises one or more of the image file and a reference to the image file.

8. The method according to claim 7, wherein creating the image file comprises:

converting the one or more digitized documents to a JPEG2000 format; and encoding the textual information and the region of interest as metadata using one or more predefined region of interest metadata tags of the JPEG2000 format.

9. The method according to claim 7, further comprising transferring the image file to a handheld computing device, wherein the image file and the textual information are configured for being displayed by a display of the handheld computing device.

10. The method according to claim 7, further comprising transferring image data corresponding to the image file to a document repository.

11. The method according to claim 7, further comprising transferring the image data from the document repository to a handheld computing device having a display and configured for receiving image data transferred from the document repository for displaying the image data on the display.

12. A non-transitory computer-readable medium storing programmable instructions configured for execution by a processor for performing the method of:

creating one or more digitized documents based on one or more original mail documents;

extracting textual information from the one or more digitized documents, wherein:

the textual information comprises intended recipient information of the one or more original mail documents; and the intended recipient information is not an electronic mail address;

identifying and tagging the intended recipient information in the textual information based on a location of the intended recipient information within the one or more digitized documents;

identifying and tagging a region of interest in the textual information, wherein the region of interest is associated with a location within the one or more digitized documents;

creating an image file, wherein the image file comprises a graphical representation of the one or more digitized documents and the textual information;

encoding the region of interest and the location associated with the region of interest in the image file, such that when a user selects the location on a user device an enlarged version of the region of interest is displayed on the user device;

searching an electronically stored address record for an electronic mail address using the intended recipient information of the one or more original mail documents;

retrieving, from the electronically stored address record, the electronic mail address; and sending an electronic mail message to the electronic mail address, wherein the electronic mail message comprises one or more of the image file and a reference to the image file.

13. The non-transitory computer-readable medium according to claim 12, wherein creating the image file comprises:

converting the one or more digitized documents to a JPEG2000 format; and encoding the textual information and the region of interest as metadata using one or more predefined region of interest metadata tags of the JPEG2000 format.

14. The non-transitory computer-readable medium according to claim 12, the method further comprising transferring the image file to a handheld computing device, wherein the image file and the textual information are configured for being displayed by a display of the handheld computing device.

15. The non-transitory computer-readable medium according to claim 12, the method further comprising transferring image data corresponding to the image file to a document repository.

16. The system according to claim 6, wherein the image data is a lower resolution than the image file that corresponds with the image data.

17. The system according to claim 6, wherein:

the handheld computing device requests the region of interest based on an input from a user associated with the location in the image file; and the region of interest is displayed in a higher resolution than the image data transferred from the document repository.

18. The method according to claim 11, wherein the image data is a lower resolution than the image file that corresponds with the image data.

19. The method according to claim 11, wherein:

the handheld computing device requests the region of interest based on an input from a user associated with the location in the image file; and the region of interest is displayed in a higher resolution than the image data transferred from the document repository.

20. The non-transitory computer-readable medium according to claim 12, the method further comprising transferring the image data from the document repository to a handheld computing device having a display and configured for receiving image data transferred from the document repository for displaying the image data on the display.

21. The non-transitory computer-readable medium according to claim 20, wherein the image data is a lower resolution than the image file that corresponds with the image data.

22. The non-transitory computer-readable medium according to claim 20, wherein:

the handheld computing device requests the region of interest based on an input from a user associated with the location in the image file; and the region of interest is displayed in a higher resolution than the image data transferred from the document repository.

23. The system according to claim 1, wherein the region of interest in the textual information comprise one or more of the intended recipient information, sender information, date information, subject information, and letter body information.

24. The system according to claim 1, wherein the enlarged version of the region of interest is displayed on the user device and a portion of the image file is also displayed on the user device.

25. The method according to claim 7, wherein the enlarged version of the region of interest is displayed on the user device and a portion of the image file is also displayed on the user device.

26. The non-transitory computer-readable medium according to claim 12, wherein the enlarged version of the region of interest is displayed on the user device and a portion of the image file is also displayed on the user device.

* * * * *